April 2, 1940.  E. L. BUSHEY  2,195,692
SIGNALING DEVICE
Filed March 29, 1939
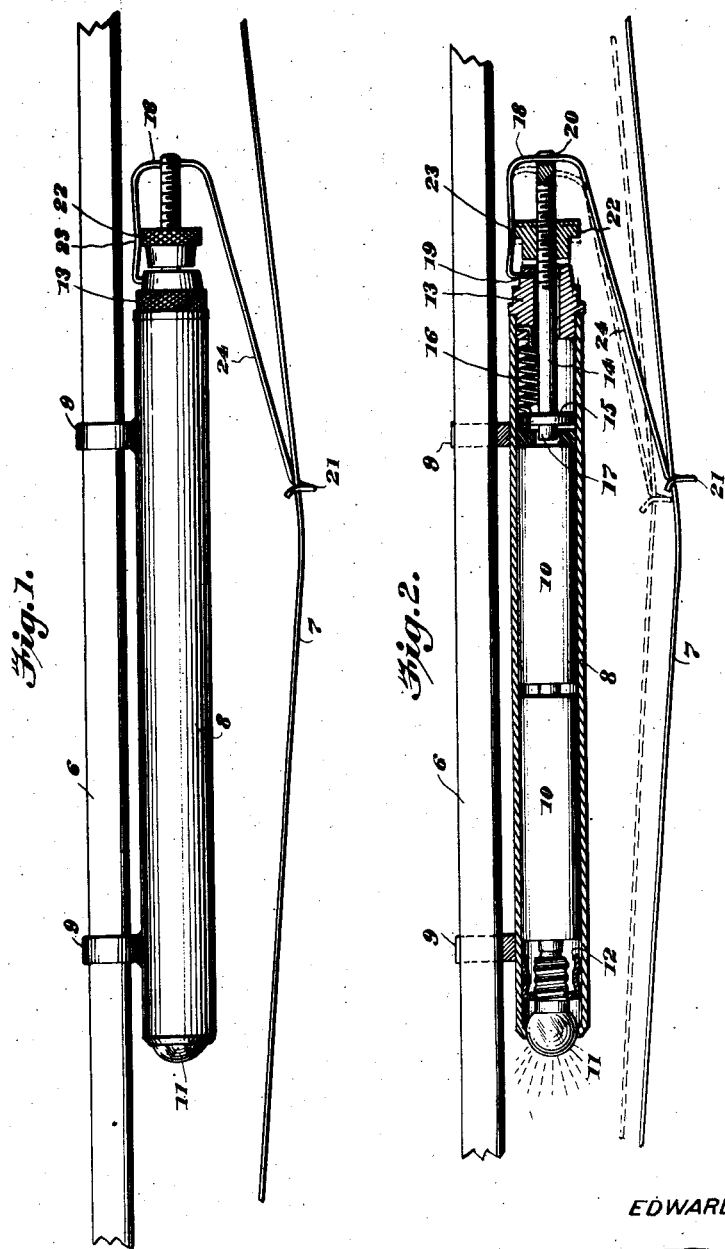
Inventor
EDWARD L. BUSHEY Patented Apr. 2, 1940

2,195,692

UNITED STATES PATENT OFFICE 2,195,692

SIGNALING DEVICE

Edward L. Bushey, Olean, N. Y., assignor to Joseph A. Scheminger, Olean, N. Y.

Application March 29, 1939, Serial No. 264,824

5 Claims. (Cl. 43—17)

This invention relates to signaling attachments for fishing poles and has for its object to provide an improved device which is operated to flash an electric lamp when a fish strikes the hook.

The invention is particularly characterized by improvements with respect to the means for supporting the parts of the attachment and for operating the switch by means of which the lamp is lighted when the fishing line is pulled by the fish.

The invention is illustrated in the accompanying drawing in which—

Fig. 1 is a side view showing the device applied to a fishing rod.

Fig. 2 is a longitudinal section.

Referring specifically to the drawing, 6 indicates the fishing rod or pole and 7 the fishing line, with which the attachment is used.

The device is carried or supported by a tubular casing 8 which may be attached to the fishing rod by any suitable means, as by clips 9. This casing contains the dry batteries 10 of ordinary construction and is provided at its rear end with an electric bulb or lamp 11 screwed into the socket or bulb holder 12, and so mounted that when the lamp is lighted it will show at the rear of the attachment, being exposed through a hole in the rear end of the tubular casing.

The front end of the tube or casing is fitted by a snug fit with a plug 13 which however can be removed to permit the batteries to be put in or taken out. This plug 13 supports and guides a switch or contact plunger 14 which works through a bore in the plug. The inner end of the plunger has a collar 15 to which is connected one end of a coil spring 16 the other end of which is connected to the plug, the spring 16 being in tension sufficient to hold the terminal 17 at the rear end of the plunger out of contact with the terminal of the battery 10.

The plunger is pushed in or tripped to close the circuit by means of a bent wire finger 18 the inner end of which is fixed at 19 to the plug 13 and projects thence forwardly and outwardly and is bent around or across the outer end of the plunger 14 where it fits in a notch 20 and extends thence rearwardly at an angle beside the casing and is provided at its free end with a loop 21 through which the fishing line is threaded. The tension or resistance of this spring finger or trigger 18 may be adjusted by a nut 22 which is screwed on the threaded outer end of the plunger 14 and said nut bears at its outer edge against the forwardly projecting part of the finger 18, as indicated at 23. It will be understood that a rather nice adjustment of the spring finger is necessary and in order to permit this adjustment or regulation the nut 22 may be screwed in or out on the plunger. As it is screwed outwardly on the plunger, in contact with the relatively fixed part or inner end of the wire 18 its effect is to increase the resistance or tension of the wire by, in effect, shortening its effective length. When the nut is screwed inwardly the opposite effect is produced and the resistance or tension of the spring is decreased. The nut can be set according to local conditions, such as the effect of current or drag upon the line, preserving however sufficient ease of operation so that when a fish strikes the finger will operate to close the circuit.

As shown, the outer part 24 of the finger 18 extends rearwardly at an angle to the battery casing, and, the fishing line 7 being threaded through the loop 21, a bend is formed in the line, or the line is held outwardly at an angle to the casing. When a fish strikes the hook and the line is jerked the line is pulled taut or straight and the effect of this is to bend the spring finger 18 by forcing the loop 21 inwardly toward the battery casing. The spring finger then and thus acts as a bent lever against the end of the plunger 14 and forces said plunger inwardly to close its terminals 17 to contact with the ordinary terminal of the battery, thereby closing the battery circuit through the metal casing 8 and the lamp, which lights the lamp and indicates to the fisherman that the fish is hooked. It will be understood that the plunger 14 is pressed inwardly to contact against the pull of the light spring 16 which normally holds the plunger in open circuit position.

As explained above the sensitiveness of the trigger finger can be adjusted or set by manipulation of the nut 22 and thus the device is adapted for use under various conditions. The device will be found particularly useful for night fishing and when the rod is supported by a stand or holder.

It may be noted that the device may be locked against operation, as when the pole is being carried or is not in use, by screwing in the nut 22 until it contacts the plug 13, thereby preventing any inward movement or circuit closing action of the switch plunger 14.

The invention is not limited to the exact structure shown but various modifications may be made within the scope of the following claims.

I claim:

1. A signal attachment for fishing rods, comprising a tubular battery casing attachment to the rod, and provided with a light bulb at one end of said casing, a switch at the other end of said casing, the switch including a contact plunger slidable in the casing to close with the battery terminal, a spring finger bearing against the outer end of the plunger to press the same inwardly when tripped, and a loop on said finger for engaging the fishing line.

2. A signal attachment as in claim 1, the plunger having a nut screwed thereon bearing against the finger and adjustable to vary the tension thereof.

3. A signal attachment as in claim 1, the casing having a guide plug in the end, through which the plunger slides, and one end of the spring finger being fixed to said plug.

4. A signal attachment as in claim 1, the spring finger being supported by the casing at its inner end and bent across the outer end of the plunger.

5. A signal attachment for fishing rods, comprising a tubular battery casing adapted to be clamped to the rod, a light bulb at the rear end of the casing, a guide plug fitting in the front end of the casing, a contact plunger slidable through the plug to close the circuit at the battery terminal, and a spring wire finger projecting from the plug and bearing against the outer end of the plunger to press the same to contact when tripped, the finger having means at its free end to engage the fishing line.

EDWARD L. BUSHEY.